H. HARDER.
AUTOMATIC BRAKE FOR RAILWAY CARS.
APPLICATION FILED AUG. 30, 1913.

1,127,886.

Patented Feb. 9, 1915.
2 SHEETS—SHEET 1.

WITNESSES.
M. Wilkinson
B. F. Buxton

INVENTOR.
HERMAN HARDER.
BY Fetherstonhaugh & Co.
ATT'YS.

H. HARDER.
AUTOMATIC BRAKE FOR RAILWAY CARS.
APPLICATION FILED AUG. 30, 1913.

1,127,886.

Patented Feb. 9, 1915.
2 SHEETS—SHEET 2.

WITNESSES.

INVENTOR.
HERMAN HARDER.
BY Featherstonhaugh & Co.
ATT'YS.

UNITED STATES PATENT OFFICE.

HERMAN HARDER, OF BELLINGHAM, WASHINGTON.

AUTOMATIC BRAKE FOR RAILWAY-CARS.

1,127,886.     Specification of Letters Patent.     Patented Feb. 9, 1915.

Application filed August 30, 1913. Serial No. 787,471.

*To all whom it may concern:*

Be it known that I, HERMAN HARDER, a subject of the King of Great Britain, and a resident of the city of Bellingham, in the State of Washington, in the United States of America, have invented certain new and useful Improvements in Automatic Brakes for Railroad-Cars, of which the following is a specification.

My invention relates to improvements in automatic brakes for railroad cars, and the like, and the object of my invention is to devise an improved form of automatic brake which can be put into action from any part of the train in a simple manner and which shall derive its "braking" action from the axle of the car in such a manner as to apply such action automatically to the wheels to effectively bring the cars to a stop.

A further object is to devise an improved form of automatic brake which shall be of simple construction, easy to get at for examination and repairs, and comparatively inexpensive to install and maintain.

I attain these objects by the construction illustrated in the accompanying drawings in which—

Figure 1:
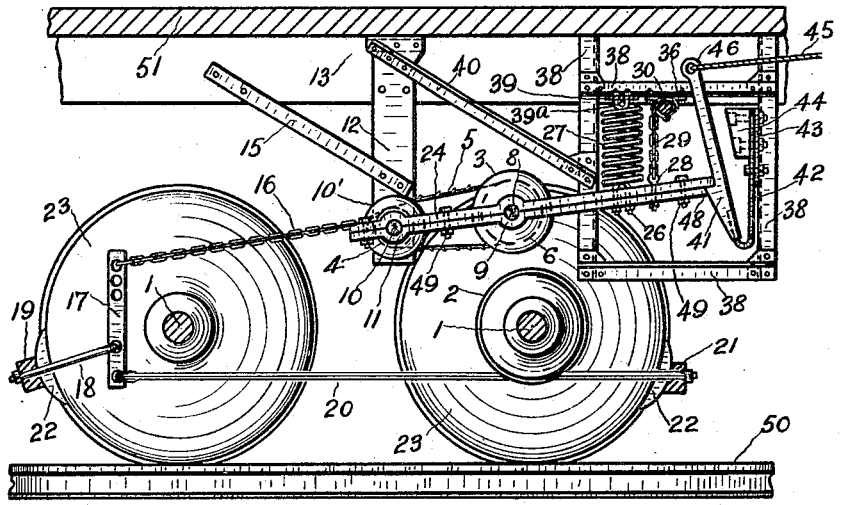
Figure 2:
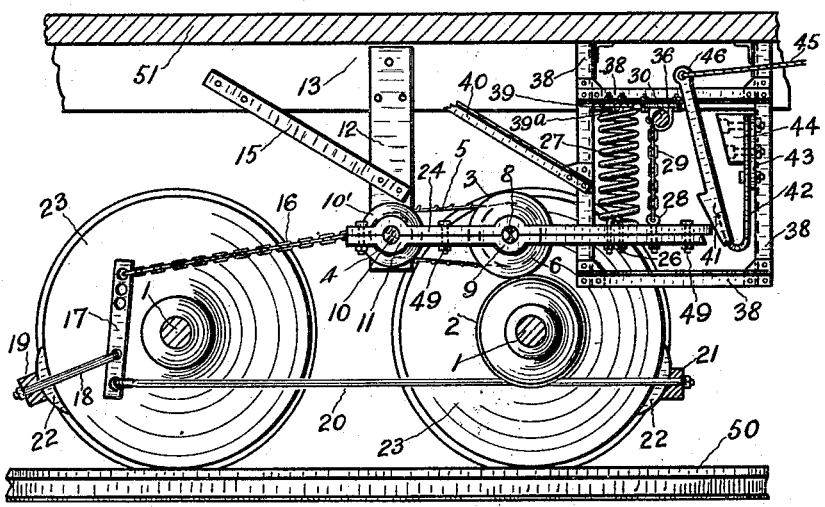
Figure 3:
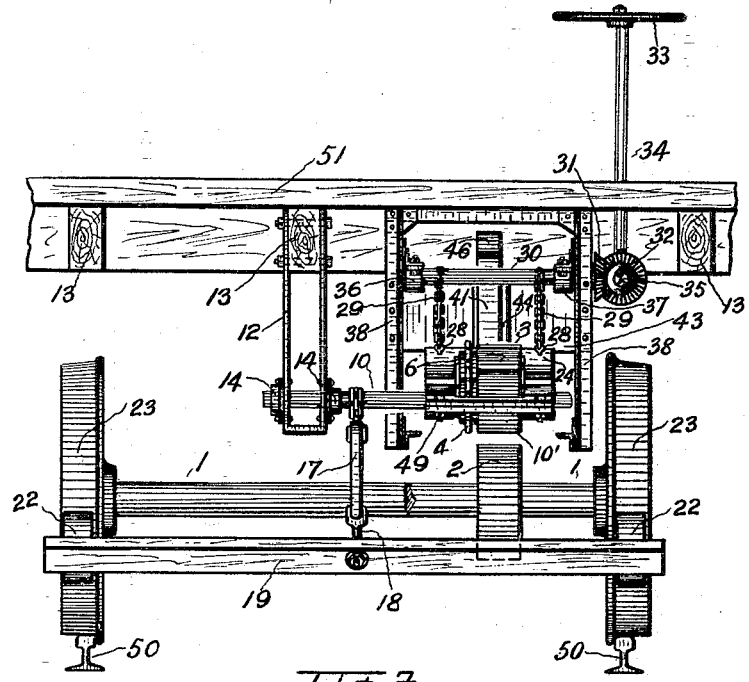
Figure 4:
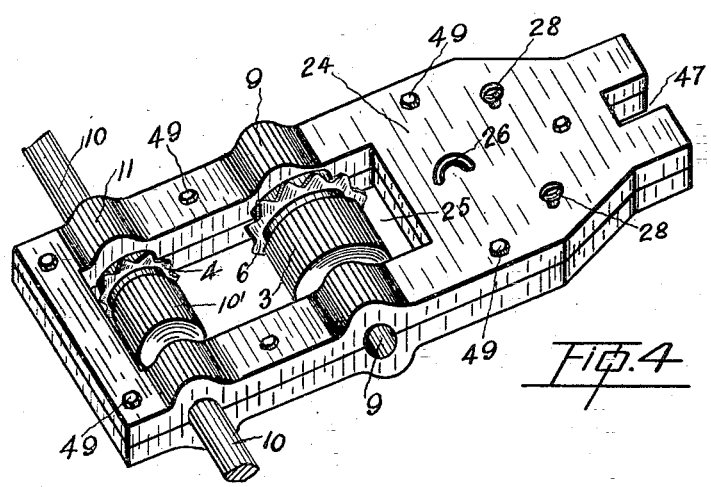

Figure 1 is a side elevation of a part of a flat car with the near side wheels removed, showing the application of my brake thereto, the brake being in the "off" position. Fig. 2 is a side elevation similar to that shown in Fig. 1, showing my brake in action. Fig. 3 is a front elevation of Fig. 1. Fig. 4 is a perspective view of the main lever.

Similar figures refer to similar parts throughout the several views.

1 represents the car axles.

2 is a friction pulley fitted on one axle for the purpose of driving the mechanism to set the brake, as hereinafter more fully described. Friction pulley 3 is the main pulley of the brake mechanism, driven by pulley 2 when the brake is being set.

4 is a sprocket driven by pulley 3 by means of a chain 5 and the sprocket 6 being formed integrally with, or secured tightly to, the pulley 3.

8 is a shaft or bolt which carries the pulley 3, and on which the pulley 3 and its sprocket 6 revolve; the shaft 8 being held from turning in its support 9 by any suitable means.

10 is a shaft which carries the sprocket 4, the same being secured to the shaft to impart its rotary motion thereto, the shaft being free to revolve in its bearings 11.

10' is an enlargement provided on the sprocket 4 which serves to prevent lateral movement of the shaft 10. This shaft 10 is extended on both ends, the extensions being supported by the brackets 12, which are secured to the floor beams 13 of the car, shown more particularly in Fig. 3. One bracket only is shown; the other is similar to it, however, and secured in the same manner. Bearings 14 are provided at the lower extremities of the brackets 12, in which the shaft 10 is free to revolve; the brackets themselves being rigidly braced to the car by the side braces 15, shown in Figs. 1 and 2.

16 is a chain secured to the shaft 10 and adapted to be wound around the shaft when the brake is in action, and thereby to exert a pulling force on the brake lever 17, to which it is attached, as shown.

18 is a rod connected at one end to the brake lever 17 and at its other end to the brake beam 19. 20 is a rod connecting the brake lever 17 to the other brake beam 21.

22 represent the brake shoes.

23 are the car wheels.

24 is the main lever, which carries the brake mechanism, and which is formed preferably as shown in Fig. 4. It is made in two duplicate parts, having formed therein the bearings 9 and 11 for the shafts 8 and 10 respectively.

25 is a slot or opening in which the pulley 3, the sprockets 6 and 4 and the endless chain 5 revolve.

26 is a U bolt provided in the main lever 24 to secure the lower end of the spring 27, which acts against the upper surface of the lever 24 to force it downward when the lever is released and in its operative position.

28 are eye bolts secured in the lever 24 to which the chains 29 are attached at their lower extremities, the purpose of these chains being to raise up the lever from its operative position, as shown in Fig. 2, to its inoperative position, as shown in Fig. 1, this being accomplished by having the upper ends of the chains 29 attached to the shaft 30, which shaft is adapted to be revolved by means of the gear 31 meshing with the gear 32, actuated by the hand wheel 33 through suitable shafting 34 and 35 and other suitable gears (not shown) disposed at the end of the car, so that when the shaft 30 is revolved in the proper direction it will wind the chains 29 around it and thus raise the lever 24.

36 and 37 are suitable bearings provided to carry the shaft 30, and these are secured to the framework 38 by any approved means. The framework 38 may be of any approved construction, according to the requirements, and is here shown built of structural steel, for the purpose of illustration.

39 is a steel plate bolted or riveted to the framework 38 for the purpose of carrying the upper end of the spring 27, which is held thereto by the U bolt 39ª.

40 represents the braces by which the framework 38 may be rigidly braced to the car structure.

41 is a spring lever by means of which the brake mechanism, as carried by the lever 24, may be held in its inoperative position, or released to drop into its operative position.

42 is a plate spring, secured at one end to the lower extremity of the lever 41, and at its upper end to the plate 43, which is fastened to the framework 38 for the purpose of carrying the spring. This spring 42 gives the lever 41 its spring action.

44 is a block, secured to the plate 43, against which the back of the lever 41 strikes to prevent its being pulled too far back and thus obviate any possibility of the spring 42 breaking at the bend.

45 is a rope connected to an eye 46 formed in the upper end of the lever 41, and which may be led to any convenient parts of the train, so that, when the rope 45 is pulled the lever 24 may be released to drop into the operative position, as shown in Fig. 2.

47 is a notch in the lever 24 into which the lever 41 engages so that it will be normally in alinement centrally with the lever 24, both levers being so formed as to efficiently engage one another to keep the lever 24 in its raised position when the mechanism is raised, as shown at 48 in Fig. 1.

49 are the bolts for holding the duplicate parts of the lever 24 together.

50 are the rails.

51 is the floor of the car.

Having now indicated the principal parts of my invention, I will now describe the manner in which it operates. The device being installed on a car, as illustrated in the drawings, it is normally carried in the position shown in Fig. 1, that is, the brakes are "off." When it is desired to put on the brakes and stop the cars, the rope 45, which is led to convenient parts of the train, is pulled, thus drawing the engaging point of the lever 41 away from under the lever 24, when the lever 24 immediately drops, bringing the pulley 3 into frictional engagement with the pulley 2, against which it is tightly held by the spring 27. As the cars are moving and the pulley 2 is turning with the axle, the pulley 3 immediately begins to revolve, thereby causing the sprocket 4 and the shaft 10 to revolve simultaneously by means of the endless chain 5 and the sprocket 6. The turning of the shaft 10 causes the chain 16 to wind around the shaft and this pulls the brake lever 17 in toward the shaft and draws the brake shoes 22 tightly against the rims of the wheels 23 by means of the rods 18 and 20 acting on the brake beams 19 and 21, thus "braking" the wheels, and bringing the cars to a standstill.

When it is desired to raise the brake mechanism, the shaft 30 is turned by means of the hand wheel 33 and the gears 31 and 32, causing the chains 29 to wind around the shaft and raise the lever 24 until the lever 41 springs back to engage underneath the lever 24 to hold it in the raised position, when, the compression of the spring 27 being regained owing to the spring being compressed between the lever 24 and the plate 39, the device is ready for further action.

It will be seen, therefore, that I have devised an improved form of automatic brake for railroad cars which can be conveniently operated from any point of the train, and which shall derive its "braking" action from the car axle in such a manner as to apply such action automatically to the wheels to effectively bring the cars to a stop. It will be seen further, that I have devised an automatic brake of simple construction, easy of access for examination and repair, and comparatively inexpensive to install and maintain.

What I claim as my invention is—

1. In an automatic brake for railway cars, the combination with the brake shoes, brake beam and operating lever, of a suitably mounted turnable member, a main lever swung at one end thereon, a frictional drive mounted upon one of the car axles, a coacting driving member mounted upon the lever, a driving connection between the coacting driving member and turnable member, a flexible connection between the turnable member and the operating lever, spring compression means extending between the free end of the lever and the body of the car, means for releasably supporting the free end of the lever against the compression means and manual means for drawing the spring lever upwardly against the compression means into engagement with the releasable holding means, as and for the purpose specified.

2. In an automatic brake for railway cars, the combination with the brake shoes, brake beam and operating lever, of a suitably mounted turnable member, a main lever swung at one end thereon, a frictional drive mounted upon one of the car axles, a coacting driving member mounted upon the lever, a driving connection between the coacting driving member and turnable member, a flexible connection between the turnable member and the operating lever, spring compression means extending between the free end of the lever and the body of the car, means for releasably supporting the free end of the lever against the compression means, a suitably mounted turnable member, a flexible connection between the turnable member and the free end of the main lever, a brake mast and hand wheel therefor, and connecting gears between the brake mast and the turnable member, as and for the purpose specified.

Dated at Bellingham, Wash., this 31st day of July 1913.

HERMAN HARDER.

Witnesses:
L. R. MULLEN,
CHRIS J. SORENSEN.

Copies of this patent may be obtained for five cents each, by addressing the "Commissioner of Patents, Washington, D. C."